Patented Dec. 12, 1944

2,365,122

UNITED STATES PATENT OFFICE 2,365,122

REFINING OF MODIFIED ALKYD RESINS

William N. Traylor, Hattiesburg, Miss., assignor to Hercules Powder Company, Wilmington, Del., a corporation of Delaware No Drawing. Application April 18, 1941,
Serial No. 389,175

14 Claims. (Cl. 260—22)

This invention relates to modified alkyd resins, and more particularly to a process for refining modified alkyd resins.

The modified alkyd resins are an important and useful resin class, being relatively inexpensive and covering a wide range of useful properties. Many modified alkyd resins, however, particularly those prepared with appreciable proportions of rosin or dark oils or other dark colored modifiers suffer from the disadvantage of being themselves relatively dark. Rosin especially has a tendency to form modified alkyd resins of dark color, apparently because of a color reaction taking place during the preparation of the rosin modified alkyd resins. Moreover, no satisfactory method of refining such dark modified alkyd resins to produce relatively light colored products has been known.

It is an object of this invention to provide a process for refining dark colored modified alkyd resins to produce light colored modified alkyd resins.

It is a further object to provide a process for refining modified alkyd resins which is extremely simple and economical.

It is a still further object of this invention to provide a process, for refining modified alkyd resins wherein the properties of the refined resins other than color are substantially unchanged.

A still further object of this invention is to provide a process for refining modified alkyd resins in which the yield of refined resins is substantially quantitative.

Other objects of the invention will appear hereinafter.

The objects of this invention in general, are accomplished by treating the modified alkyd resins with nascent hydrogen. The treatment is carried out under conditions which will provide intimate contact between the modified alkyd resins and the nascent hydrogen. As a result, the color of the modified alkyd resins becomes substantially lightened with practically no loss in yield and no perceptible effect on the other physical properties.

In accordance with the process of this invention the treatment is carried out on the modified alkyd resins in the molten condition or on the resins dissolved in a suitable solvent. After the treatment of the modified alkyd resins is completed, the resins or their solution may be washed to remove any water-soluble material and filtered to remove any suspended matter. If desired, the solution may be filtered prior to the washing step. In the case of treatment of the modified alkyd resins in solution, the resins of improved color may then be recovered by evaporation of the solvent.

The process of this invention is applicable to the modified alkyd resins. Such resins include alkyd resins modified with rosins such as gum or wood rosin or with heat treated or polymerized rosin, or with fatty oils such as tung oil or linseed oil, castor oil, etc., or the fatty acids derived from such oils, or with synthetic resins such as phenol aldehyde resins, etc., and to alkyd resins which may be modified by mixtures of such modifying components. The polybasic acid and polyhydric alcohol components of the modified alkyd resin may be any of the usual alkyd resin components, such as phthalic, maleic, succinic, diglycolic, camphoric, or 1,8 naphthalic acids, etc., and polyhydric alcohols such as ethylene glycol, diethylene glycol, glycerol, mannitol or pentaerythritol, etc. The process of this invention is especially effective when applied to such of the above resins which are relatively dark in color, for example, because of the discoloration usually occurring during the preparation of the resins or of discoloration due to a high content of a relatively dark colored rosin or other modifying agent. The refining treatment may be applied desirably to the resin immediately after its preparation.

As solvents for the modified alkyd resins where the treatment is carried out on the resins in solution, any solvent for the modified alkyd resins may be used which is itself inert in the treatment. Among such solvents are, for example, monocyclic aromatic hydrocarbons, such as benzene, toluene, xylene, etc.; petroleum hydrocarbons such as gasoline, V. M. and P. naphtha, hexane, heptane, etc.; hydrogenated petroleum hydrocarbons, such as those known in the trade as "Solvesso," turpentine, terpenes, and solvents such as ethylene dichloride, carbon tetrachloride, dichloroethyl ether, isopropyl ethers, cyclohexane, methyl cyclohexane, P-menthane, tetrahydro and decahydronaphthalenes, etc. When the treatment is carried out on the modified alkyd resins in solution, the concentration of the resins in solution is not critical and may be selected so as to provide adequate workability of the solution. In general, a concentration within the range of about 10% to about 75% by weight may be used, but preferably the concentration is held within the range of about 30% to 50% by weight.

The nascent hydrogen for use in the treatment of the modified alkyd resins in accordance with this invention may be derived by any of the well-known procedures for generating nascent hydrogen. Preferably, the nascent hydrogen may be provided by the reaction under ionizing conditions of an acid reactant with a metal above hydrogen in the electromotive series. The acid reactant may be either an acid or an acid salt or a mixture thereof. Among the acid reactants which may be used are, for example, hydrochloric acid, sulfuric acid, phosphoric acid, acetic acid, sodium acid sulfate, potassium acid sulfate, monosodium acid phosphate, calcium acid phosphate, etc. The preferred acid reactants are the acid salts, sodium acid sulfate being particularly effective.

Any of the metals above hydrogen in the electromotive series may be employed. It will be preferable, however, to use such metals which form salts having no appreciable discoloring action on the modified alkyd resins. The metals are used preferably though not necessarily in a finely divided form. Use of metals such as, for example, cadmium, aluminum, manganese, tin, and zinc is very desirable. Zinc in the form of zinc dust, mossy zinc, or zinc powder is particularly well adapted to the process.

It will be desirable that at least a small amount of water or of some other ionizing solvent be present to accelerate the refining action. Use of an aqueous acid or of the hydrate of an acid salt, or an aqueous solution of an acid salt will provide the desired refining effect. It will be understood that the acid reactant and the metal are both in contact with the modified alkyd resins during the treatment.

The nascent hydrogen may likewise be produced electrolytically. When using nascent hydrogen produced by electrolysis, the modified alkyd resins may, for example, be dissolved in a suitable solvent and placed in a suitable electrolytic cell; an acid solution or an aqueous salt solution may then be added to provide ionization, and a direct current may then be passed through the cell for a length of time dependent on the current and the degree of refining desired.

It is desirable to employ vigorous agitation in carrying out the treatment to obtain thorough contact of the reactants and to accelerate the refining action.

The speed with which the modified alkyd resins becomes refined is also dependent on the temperature employed in the treatment. While the treatment may be carried out at room temperature with the modified alkyd resins dissolved in a suitable solvent, the rate of refining is rather slow for practical purposes. It is preferable to carry out the treatment at elevated temperatures, and temperatures as high as 200° C. have been found to be satisfactory although higher temperatures are possible. A temperature within the range of about 70° C. to about 125° C. is preferable. When carrying out the treatment of the modified alkyd resins in solution, it is convenient to carry out the treatment at the reflux temperature of the solvent. Where the treatment is to be carried out above the normal boiling point of the solvent, use of superatmospheric pressure is resorted to. The pressures employed are in no way limiting on the process, and the equipment employed will generally determine the maximum pressure which is practical.

The time of treatment of the modified alkyd resins may be varied to produce the result desired. The time necessary to provide satisfactory refining of the resins will be dependent on such factors as the amount of color bodies present in the modified alkyd resins, the temperature of treatment, the amount of nascent hydrogen utilized, etc. For this reason, it is impossible to state any definite time necessary, except in relation to a given set of conditions. Under usual conditions, reaction times between about 10 minutes and 5 hours may be satisfactory, although depending on specific conditions longer or shorter contact times are entirely possible.

The amount of acid reactant used for producing nascent hydrogen, when this method of generating nascent hydrogen is employed, may vary over a wide range, depending on such factors as the particular acid reactant used, the degree of refining desired, the particular conditions of treatment, as well as other factors. Assuming the acid reactant to be on an anhydrous basis, ratios of modified alkyd resin to acid reactant as high as 40 to 1 on a weight basis have been used. In general, however, ratios varying between 10 of modified alkyd resin to 1 of acid reactant down to 1 of modified alkyd resins to 1 of acid reactant are desirable. A preferred ratio is approximately 3 of modified alkyd resin to 1 of acid reactant.

The concentration of the acid reactant in terms of ionizing solvent may also be widely varied, for example, sulfuric acid may be used as the acid reactant in concentration of from 3% to 95% in aqueous solution, while acetic acid may if desired be used in the substantially anhydrous form of glacial acetic acid. When acids are used as the acid reactants, however, concentration of acid of 20 to 50% are generally preferable. When using acid salts as acid reactants, a hydrate, or an aqueous solution from a concentration of about 5% by weight to a saturated solution may be employed. The monohydrate of sodium acid sulfate, for example, is a particularly effective acid reactant in the process according to the invention.

The amount of metal above hydrogen in the electromotive series which is employed is not particularly critical. It will be preferable, however, to have such an amount of metal present which will be an excess over the theoretical amount required to react with the acid reagent present.

The process of refining modified alkyd resins in accordance with this invention may also be carried out as a continuous process if desired. Thus, for example, the modified alkyd resin solution may be treated with the acid reactant and the metal above hydrogen in the electromotive series in a suitable vessel and while additional modified alkyd resin solution is fed into the vessel continuously, the refined modified alkyd resin solution is withdrawn from the vessel at substantially the same rate. The acid reagent and metal may be replenished as necessary and the refined solution passed to a continuous evaporator for removal of the solvent.

The use of an inert atmosphere such as provided by nitrogen, hydrogen, carbon dioxide, etc., during the various refining steps is often of assistance in obtaining pale colors. This may be particularly helpful during washing of treated modified alkyd resin solutions or in evaporation of solvents therefrom.

As illustrative of the improved process of refining modified alkyd resins in accordance with this invention, the examples appearing below are cited as typical of the various embodiments.

The colors shown in the examples are those corresponding to the Standard U. S. Rosin Type.

EXAMPLE 1

A modified alkyd resin was prepared by heating together 1200 parts by weight of K wood rosin, 300 parts by weight of phthalic anhydride, and 289 parts by weight of glycerin to 270° C. under nitrogen until the acid number was reduced to 10. The mixture was sparged at 270° C. with $N_2$ for 45 minutes, then cooled under nitrogen. The finished resin had a color grade H, a drop melting point of 100° C. and an acid number of 10.

Solutions of 100 parts by weight of this resin were dissolved in 300 parts by weight of solvent, and refluxed for one hour with the refining agent. The resin solution was separated from the refining agent, water washed, filtered to remove any dispersed metal, and the solvent evaporated under vacuum.

Types of refining agents and results of the separate treatments are shown in the Table I below. The drop melting point and acid number of the resin were not changed by the treatment.

TABLE I

*Refining agent*

| Treatment No. | Acid reactant | Metal | Solvent | Color |
|---|---|---|---|---|
| 1 | 40 pts. by wt. $NaHSO_4 \cdot H_2O$ | 35 pts. by wt. Zn powder | Benzene | WG |
| 2 | do | do | Ethylene dichloride | WW |
| 3 | 50 pts. by wt. aqueous 15% HCl | 30 pts. by wt. Zn powder | Narrow range gasoline solvent | I |
| 4 | 50 pts. by wt. aqueous 50% acetic acid | 30 pts. by wt. Zn powder | do | I+ |

EXAMPLE 2

A modified alkyd resin was prepared by heating a mixture of 1200 parts by weight of polymerized rosin of acid number 150, drop melting point 100° C., and color WG, 300 parts by weight of phthalic anhydride and 285 parts by weight of glycerin at 270° C. under $N_2$ until the acid number was reduced to 10. The mixture was sparged at 270° C. with nitrogen for 45 minutes, then cooled. The resin had a drop melting point of 115° C., a color of Grade G, and an acid number of 10. The refining process was carried out on this resin as in Example 1, using 40 parts by weight of $$NaHSO_4 \cdot H_2O$$

and 35 parts by weight of Zn powder to treat 100 parts by weight of resin dissolved in 300 parts by weight of benzene. The melting point and acid number were unchanged by the treatment while the color of the refined resin was H.

EXAMPLE 3

A modified alkyd resin was prepared from the following materials:

| Ingredients | Parts by weight |
|---|---|
| K wood rosin | 200 |
| Phthalic anhydride | 74 |
| Succinic acid | 72 |
| Glycerol | 101 |
| Tung oil | 140 |

The ingredients were heated together at 270° C. in an atmosphere of nitrogen for 6 hours, then sparged for 1 hour with nitrogen at 270° C., then cooled. The resin thus prepared had a color of G.

One hundred parts by weight of this resin was dissolved in 300 parts by weight of benzene and this solution treated with 40 parts by weight of $NaHSO_4 \cdot H_2O$ and 35 parts by weight of Zn powder. The refining process was carried out as in Example 1. The color of the resin was improved from G to I.

EXAMPLE 4

340 g. phthalic anhydride, 344 g. soybean fatty acids and 218 g. glycerine were heated at 220° C. in a $CO_2$ atmosphere under a condenser for a period of 5 hours. After sparging for ½ hour with $CO_2$ at 220° C. the acid number was 5.6 and the 200° C. cure time 40 seconds. The resin was diluted with an equal weight of mineral spirits. The resin solution had a color of 4 on the Hellige scale.

200 g. of the above resin solution was refluxed with agitation for ¾ hour with 40 g. zinc powder and 70 g. $NaHSO_4$. The solution was decanted from the solid matter, filtered, water-washed, and dried with anhydrous $Na_2SO_4$. The solution had a color of 1 on the Hellige scale.

It will be understood that the details and examples hereinbefore set forth are illustrative only and that the invention as broadly described and claimed is in no way limited thereby.

What I claim and desire to protect by Letters Patent is:

1. A process for refining a modified alkyd resin which comprises treating said modified alkyd resin dissolved in a suitable solvent with nascent hydrogen formed by the reaction of an acidic reactant containing ionizable hydrogen with a metal above hydrogen in the electromotive series in contact with said modified alkyd resin, and in the presence of at least a small amount of water.

2. A process for refining a modified alkyd resin which comprises treating said modified alkyd resin dissolved in a suitable solvent with nascent hydrogen formed by the reaction of an acid with a metal above hydrogen in the electromotive series in contact with said modified alkyd resin solution, and in the presence of at least a small amount of water.

3. A process for refining a modified alkyd resin which comprises treating said modified alkyd resin dissolved in a suitable solvent with nascent hydrogen formed by the reaction of an acid and zinc in contact with said modified alkyd resin solution, and in the presence of at least a small amount of water.

4. A process for refining a modified alkyd resin which comprises treating said modified alkyd resin dissolved in a suitable solvent with nascent hydrogen formed by the reaction of an acid salt with a metal above hydrogen in the electromotive series in contact with said modified alkyd resin solution, and in the presence of at least a small amount of water.

5. A process for refining a modified alkyd resin which comprises treating said modified alkyd resin dissolved in a suitable solvent with nascent hydrogen formed by the reaction of sodium acid sulfate and a metal above hydrogen in the electromotive series in contact with said modified alkyd resin solution, and in the presence of at least a small amount of water.

6. A process for refining a modified alkyd resin which comprises treating said modified alkyd resin dissolved in a suitable solvent with nascent hydrogen formed by the reaction of an acidic reactant and zinc in contact with said modified alkyd resin solution, and in the presence of at least a small amount of water.

7. A process for refining a modified alkyd resin which comprises treating said modified alkyd resin dissolved in a suitable solvent with nascent hydrogen formed by the reaction of sodium acid sulfate and zinc in contact with said modified alkyd resin solution, and in the presence of at least a small amount of water.

8. A process for refining a modified alkyd resin which comprises treating said modified alkyd resin dissolved in a suitable solvent with nascent hydrogen formed by the reaction of sodium acid sulfate monohydrate and zinc in contact with said modified alkyd resin solution, and in the presence of at least a small amount of water.

9. A process for refining a modified alkyd resin which comprises treating said modified alkyd resin dissolved in a suitable solvent with nascent hydrogen formed by the reaction of an acidic reactant and a metal above hydrogen in the electromotive series in contact with said modified alkyd resin solution at a temperature within the range of about 70° to about 125° C., and in the presence of at least a small amount of water.

10. A process for refining a modified alkyd resin which comprises treating said modified alkyd resin dissolved in a suitable solvent with nascent hydrogen formed by the reaction of sodium acid sulfate monohydrate and zinc in contact with said modified alkyd resin solution at a temperature within the range of about 70° to about 125° C., and in the presence of at least a small amount of water.

11. A process for refining a rosin modified alkyd resin which comprises treating said rosin modified alkyd resin dissolved in a suitable solvent with nascent hydrogen formed by the reaction of an acidic reactant with a metal above hydrogen in the electromotive series in contact with said rosin modified alkyd resin solution, and in the presence of at least a small amount of water.

12. A process for refining a rosin modified alkyd resin which comprises treating said rosin modified alkyd resin dissolved in a suitable solvent with nascent hydrogen formed by the reaction of sodium acid sulfate monohydrate and zinc in contact with said rosin modified alkyd resin solution at a temperature within the range of about 70° to about 125° C., and in the presence of at least a small amount of water.

13. A process for refining a drying oil modified alkyd resin which comprises treating said drying oil modified alkyd resin dissolved in a suitable solvent with nascent hydrogen formed by the reaction of an acidic reactant with a metal above hydrogen in the electromotive series in contact with said drying oil modified alkyd resin solution, and in the presence of at least a small amount of water.

14. A process for refining a drying oil modified alkyd resin which comprises treating said drying oil modified alkyd resin dissolved in a suitable solvent with nascent hydrogen formed by the reaction of sodium acid sulfate monohydrate and zinc in contact with said drying oil modified alkyd resin solution at a temperature within the range of about 70° to about 125° C., and in the presence of at least a small amount of water.

W. N. TRAYLOR.

CERTIFICATE OF CORRECTION.

Patent No. 2,365,122. December 12, 1944.

WILLIAM N. TRAYLOR.

It is hereby certified that error appears in the printed specification of the above numbered patent requiring correction as follows: Page 3, Table I, third column thereof, opposite Treatment No. 3, for "Zn" read --Sn--; and that the said Letters Patent should be read with this correction therein that the same may conform to the record of the case in the Patent Office.

Signed and sealed this 20th day of March, A. D. 1945.

Leslie Frazer (Seal) Acting Commissioner of Patents.

alkyd resin solution, and in the presence of at least a small amount of water.

6. A process for refining a modified alkyd resin which comprises treating said modified alkyd resin dissolved in a suitable solvent with nascent hydrogen formed by the reaction of an acidic reactant and zinc in contact with said modified alkyd resin solution, and in the presence of at least a small amount of water.

7. A process for refining a modified alkyd resin which comprises treating said modified alkyd resin dissolved in a suitable solvent with nascent hydrogen formed by the reaction of sodium acid sulfate and zinc in contact with said modified alkyd resin solution, and in the presence of at least a small amount of water.

8. A process for refining a modified alkyd resin which comprises treating said modified alkyd resin dissolved in a suitable solvent with nascent hydrogen formed by the reaction of sodium acid sulfate monohydrate and zinc in contact with said modified alkyd resin solution, and in the presence of at least a small amount of water.

9. A process for refining a modified alkyd resin which comprises treating said modified alkyd resin dissolved in a suitable solvent with nascent hydrogen formed by the reaction of an acidic reactant and a metal above hydrogen in the electromotive series in contact with said modified alkyd resin solution at a temperature within the range of about 70° to about 125° C., and in the presence of at least a small amount of water.

10. A process for refining a modified alkyd resin which comprises treating said modified alkyd resin dissolved in a suitable solvent with nascent hydrogen formed by the reaction of sodium acid sulfate monohydrate and zinc in contact with said modified alkyd resin solution at a temperature within the range of about 70° to about 125° C., and in the presence of at least a small amount of water.

11. A process for refining a rosin modified alkyd resin which comprises treating said rosin modified alkyd resin dissolved in a suitable solvent with nascent hydrogen formed by the reaction of an acidic reactant with a metal above hydrogen in the electromotive series in contact with said rosin modified alkyd resin solution, and in the presence of at least a small amount of water.

12. A process for refining a rosin modified alkyd resin which comprises treating said rosin modified alkyd resin dissolved in a suitable solvent with nascent hydrogen formed by the reaction of sodium acid sulfate monohydrate and zinc in contact with said rosin modified alkyd resin solution at a temperature within the range of about 70° to about 125° C., and in the presence of at least a small amount of water.

13. A process for refining a drying oil modified alkyd resin which comprises treating said drying oil modified alkyd resin dissolved in a suitable solvent with nascent hydrogen formed by the reaction of an acidic reactant with a metal above hydrogen in the electromotive series in contact with said drying oil modified alkyd resin solution, and in the presence of at least a small amount of water.

14. A process for refining a drying oil modified alkyd resin which comprises treating said drying oil modified alkyd resin dissolved in a suitable solvent with nascent hydrogen formed by the reaction of sodium acid sulfate monohydrate and zinc in contact with said drying oil modified alkyd resin solution at a temperature within the range of about 70° to about 125° C., and in the presence of at least a small amount of water.

W. N. TRAYLOR.

---

CERTIFICATE OF CORRECTION.

Patent No. 2,365,122. December 12, 1944.

WILLIAM N. TRAYLOR.

It is hereby certified that error appears in the printed specification of the above numbered patent requiring correction as follows: Page 3, Table I, third column thereof, opposite Treatment No. 3, for "Zn" read --Sn--; and that the said Letters Patent should be read with this correction therein that the same may conform to the record of the case in the Patent Office.

Signed and sealed this 20th day of March, A. D. 1945.

Leslie Frazer (Seal) Acting Commissioner of Patents.